US012235602B2

(12) United States Patent
Muramatsu et al.

(10) Patent No.: US 12,235,602 B2
(45) Date of Patent: Feb. 25, 2025

(54) FIXING BELT AND HEAT FIXING DEVICE

(71) Applicant: CANON KABUSHIKI KAISHA, Tokyo (JP)

(72) Inventors: Hiroki Muramatsu, Tokyo (JP); Noriaki Kobayashi, Ibaraki (JP); Tomoyo Miyakai, Tokyo (JP); Ryo Ishifuji, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/484,639

(22) Filed: Oct. 11, 2023

(65) Prior Publication Data

US 2024/0126196 A1 Apr. 18, 2024

(30) Foreign Application Priority Data

Oct. 13, 2022 (JP) ................................ 2022-164721
Sep. 25, 2023 (JP) ................................ 2023-161480

(51) Int. Cl.
*G03G 15/20* (2006.01)

(52) U.S. Cl.
CPC ..... *G03G 15/2057* (2013.01); *G03G 15/2064* (2013.01); *G03G 2215/2051* (2013.01)

(58) Field of Classification Search
CPC ........... G03G 15/2053; G03G 15/2057; G03G 15/206; G03G 15/2064; G03G 2215/2016; G03G 2215/2035; G03G 2215/2051
See application file for complete search history.

(56) References Cited

U.S. PATENT DOCUMENTS

2018/0217538 A1* 8/2018 Abe .................. G03G 15/2057
2019/0377290 A1* 12/2019 Kitano .............. G03G 15/2057

FOREIGN PATENT DOCUMENTS

JP 2007219371 A 8/2007
JP 2012225986 A 11/2012
JP 2014153659 A 8/2014
JP 2016157066 A 9/2016
JP 2017219371 A 12/2017
JP 2018036595 A 3/2018
JP 2019056750 A 4/2019
JP 2019215532 A 12/2019

* cited by examiner

*Primary Examiner* — Sophia S Chen
(74) *Attorney, Agent, or Firm* — CANON U.S.A., INC. IP DIVISION

(57) ABSTRACT

A fixing belt having an endless shape includes a base layer having an endless shape, an elastic layer on an outer peripheral surface of the base layer, and a surface layer on an outer peripheral surface of the elastic layer, the elastic layer containing a rubber and fillers dispersed in the rubber, the fillers containing heat conductive fillers, an entire thickness of the elastic layer is from 100 μm to 3,000 μm, a content ratio of the fillers with respect to the entirety of the elastic layer being 35% by volume or more, a content ratio of the fillers in a region A being less than 35% by volume with respect to the region A, and the entirety of the elastic layer having a thermal conductivity of 0.4 W/(m·K) or more in a thickness direction thereof.

10 Claims, 4 Drawing Sheets

FIXING BELT AND HEAT FIXING DEVICE

BACKGROUND

Technical Field

The present disclosure relates to a fixing belt to be used in a heat fixing device of an electrophotographic image forming apparatus, and to a heat fixing device.

Description of the Related Art

A fixing member having a configuration, which is obtained by laminating an elastic layer containing a rubber excellent in heat resistance such as a silicone rubber on a base layer including a heat-resistant resin or a metal and a surface layer, is available as a fixing member to be used in the heat fixing device of an electrophotographic image forming apparatus, such as a printer, a copying machine, or a facsimile. The surface layer contains a fluorine resin that imparts excellent releasability to toner. In addition, to impart high thermal conductivity in the thickness direction of the elastic layer, heat conductive fillers may be incorporated into the elastic layer (Japanese Patent Application Laid-Open No. 2007-219371).

The electrophotographic image forming apparatus has been required to be further improved in durability. Along with this requirement, the fixing member has also started to be required to have an even longer lifetime. However, in the fixing member including the elastic layer in which heat flow paths of the heat conductive fillers are formed, peeling may occur in the vicinity of an interface between the elastic layer and the surface layer when the fixing member is used over a long time period.

SUMMARY

At least one aspect of the present disclosure is directed to providing a fixing belt, which has high thermal conductivity in its thickness direction, and does not cause peeling between its surface layer and elastic layer even when used over a long time period. In addition, at least one aspect of the present disclosure is directed to providing a heat fixing device that can stably form a high-quality electrophotographic image. According to one aspect of the present disclosure, there is provided a fixing belt having an endless shape comprising: a base layer having an endless shape; an elastic layer on an outer peripheral surface of the base layer; and a surface layer on an outer peripheral surface of the elastic layer, the elastic layer containing a rubber and fillers dispersed in the rubber, the fillers containing heat conductive fillers, an entire thickness of the elastic layer is from 100 μm to 3,000 μm, a content ratio of the fillers with respect to the entirety of the elastic layer being 35% by volume or more, wherein when a region from a surface of the elastic layer on a side facing the surface layer to a thickness of 50 μm toward a surface of the elastic layer on an opposite side is defined as a region A, a content ratio of the fillers in the region A is less than 35% by volume with respect to the region A, and wherein the entirety of the elastic layer has a thermal conductivity of 0.4 W/(m·K) or more in a thickness direction thereof.

In addition, according to another aspect of the present disclosure, there is provided a heat fixing device including: the above-mentioned fixing belt; and a heating device to head the fixing belt arranged inside the fixing belt.

Further features of the present disclosure will become apparent from the following description of exemplary embodiments with reference to the attached drawings.

DESCRIPTION OF THE EMBODIMENTS

Figure 1:
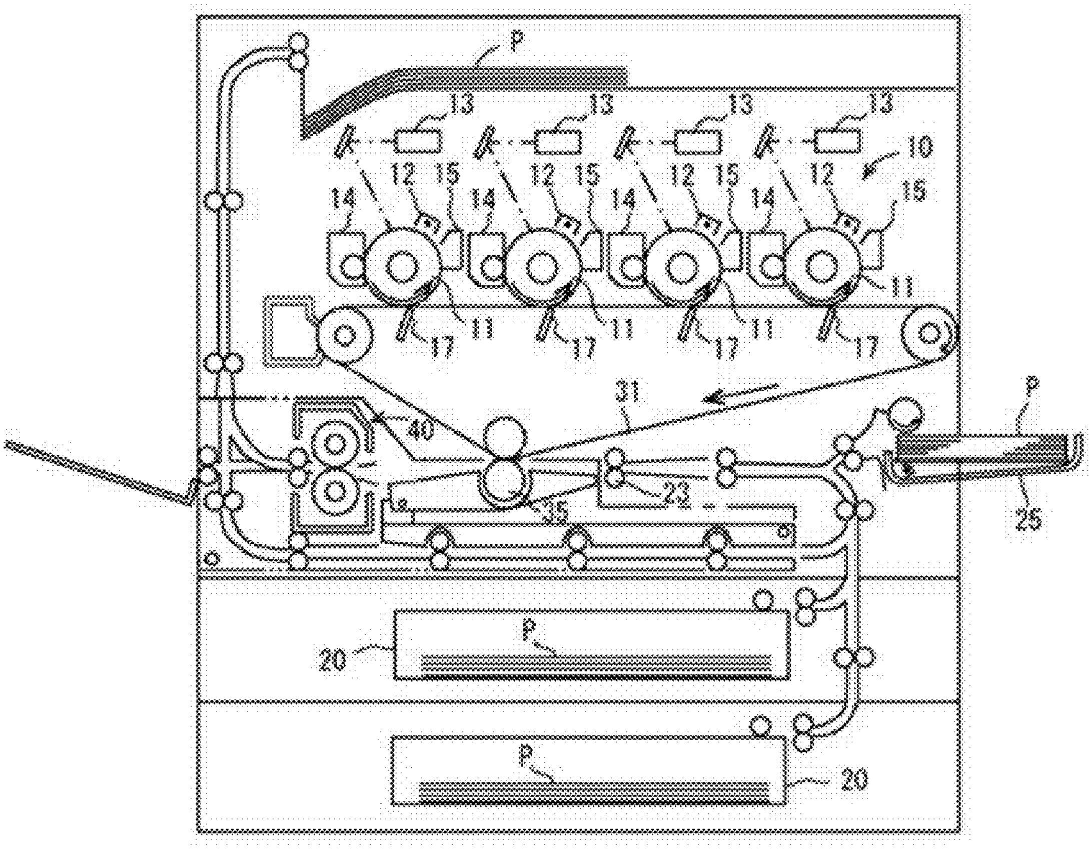
FIG. 1 is a schematic view of an image forming apparatus in a first embodiment.

Herein, the descriptions "○○ or more and xx or less" and "from ○○ to xx" representing numerical ranges each mean a numerical range including a lower limit and an upper limit that are end points unless otherwise stated. In addition, when numerical ranges are described in a stepwise manner, the descriptions disclose that the upper limits and lower limits of the respective numerical ranges are arbitrarily combined.

A fixing belt having an endless belt shape according to at least one embodiment of the present disclosure is described in detail below. The technical scope of the present disclosure is not limited to the following description.

The inventors have assumed the reason for the occurrence of peeling at an interface between the surface layer and the elastic layer when the fixing member according to Japanese Patent Application Laid-Open No. 2007-219371 is used over a long time period as described below. In a fixing step, moving paper is brought into contact with the surface of the surface layer, and hence the surface layer tries to follow the conveyance of the paper. As a result, a large shear force is applied to the interface between the surface layer and the elastic layer. An "adhesive force" and a "peel force" are involved in the adhesion between the surface layer and the elastic layer. When the relationship of "adhesive force>peel force" is established, an adhesiveness is secured. Meanwhile, when the relationship of "adhesive force<peel force" is established, peeling occurs. The above-mentioned shear force functions as a peel force. Along with an increase in process speed of an electrophotographic image apparatus in recent years, a shear force applied to the fixing member has become higher. As a result, the following situation has started to occur: the peel force becomes larger than the adhesive force between the surface layer and the elastic layer.

In such situation, the inventors have made an investigation, and as a result, have found that the heat conductive fillers in the elastic layer influence the peeling in the vicinity of the interface between the elastic layer and the surface layer. Specifically, it has been found that, when the heat conductive fillers are present in a large amount in the vicinity of the surface of the elastic layer on a side close to the surface layer, the elastic layer and the surface layer may be peeled from each other in the vicinity of the interface therebetween. The mechanism of the peeling is assumed as described below. When the content of the heat conductive fillers in the elastic layer is large, the distance between the heat conductive fillers becomes small. In this case, when a high shear force is applied to the elastic layer, a stress is concentrated on the portion of a rubber present between the heat conductive fillers to cause cracks in the elastic layer. Then, cracks may grow to cause the above-mentioned peeling. Meanwhile, when the content of the heat conductive fillers in the elastic layer is reduced, the thermal conductivity of the elastic layer in the thickness direction is decreased.

Accordingly, from the viewpoint of preventing the peeling at the interface between the surface layer and the elastic layer, it is preferred that the content of the fillers in the elastic layer be small, and in particular, the elastic layer be free of the fillers. Meanwhile, from the viewpoint of imparting high thermal conductivity in the thickness direction of the elastic layer, it is preferred that the content of the heat conductive fillers in the elastic layer be large. In view of the foregoing, the inventors have made investigations repeatedly in order to achieve both the prevention of peeling between the elastic layer and the surface layer and the securing of high thermal conductivity of the elastic layer in the thickness direction at high levels. In the process of the investigations, the inventors have obtained the following investigation result: a stress caused by a shear force is liable to be concentrated particularly in a thickness region from the surface of the elastic layer on a side facing the surface layer (interface between the elastic layer and the surface layer) to a position of 50 μm toward the surface thereof on an opposite side (interface between the elastic layer and the base layer). This region is hereinafter sometimes referred to as "region A". In view of the foregoing, the inventors have produced a fixing member including an elastic layer in which the content of the filler particles in the entirety of the elastic layer is set to be 35% by volume or more while the content of the filler particles in the region A is set to be less than 35% by volume and evaluated the fixing member. As a result, it has been found that, in this fixing member, the thermal conductivity of the elastic layer in the thickness direction exhibits a value as high as 0.40 W/(m·K) or more, and the peeling is less liable to occur in the vicinity of the interface between the surface layer and the elastic layer even when the fixing member is used over a long time period.

That is, a fixing belt according to at least one aspect of the present disclosure includes at least a base layer having an endless shape, an elastic layer formed on an outer peripheral surface of the base layer, and a surface layer formed on an outer peripheral surface of the elastic layer. The elastic layer contains a rubber and filler particles dispersed in the rubber, and the filler particles contain heat conductive filler particles. In addition, the elastic layer has an entire thickness of from 100 μm to 3,000 μm, and a content ratio of the filler particles with respect to the entirety of the elastic layer is 35% by volume or more. In addition, when a region from a surface of the elastic layer on a side facing the surface layer to a thickness of 50 μm toward a surface of the elastic layer on an opposite side is defined as a region A, a content ratio of the filler particles in the region A is less than 35% by volume with respect to the region A. Further, the entirety of the elastic layer has a thermal conductivity of 0.4 W/(m·K) or more, preferably from 0.4 W/(m·K) to 3.5 W/(m·K) in a thickness direction thereof.

A fixing belt having an endless belt shape according to at least one embodiment of the present disclosure is described in detail below. The fixing belt having an endless belt shape is hereinafter sometimes simply referred to as "fixing belt". The technical scope of the present disclosure is not limited to the following description. FIG. 1 is a sectional view of a color electrophotographic image forming apparatus according to at least one aspect of the present disclosure in a direction along the direction in which a recording material is conveyed. In the present disclosure, the electrophotographic image forming apparatus is sometimes simply referred to as "printer".

The printer illustrated in FIG. 1 includes an image forming portion 10 for each of yellow (Y), magenta (M), cyan (C), and black (Bk) colors. A photosensitive drum (photosensitive member) 11 is charged by a charger 12 in advance. After that, the photosensitive drum 11 is exposed to light by a laser scanner 13, and hence an electrostatic latent image is formed thereon. The electrostatic latent image is turned into a toner image by a developing unit 14. The toner images on the photosensitive drums 11 are sequentially transferred onto, for example, an intermediate transfer belt 31 serving as an image-bearing member by primary transfer blades 17. After the transfer, toner remaining on the photosensitive drum 11 is removed by a cleaner 15. As a result, the surface of the photosensitive drum 11 is cleaned to prepare for next image formation.

A recording material P is fed from a sheet-feeding cassette 20 or a multi-sheet-feeding tray 25 one by one into a pair of registration rollers 23. The pair of registration rollers 23 receives the recording material P once, and when the recording material skews, the pair of registration rollers straightens the material. Then, the pair of registration rollers feeds the recording material P into a space between the intermediate transfer belt 31 and a secondary transfer roller 35 in synchronization with the toner images on the intermediate transfer belt 31. The color toner images on the intermediate transfer belt are transferred onto the recording material P by, for example, the secondary transfer roller 35 serving as a transfer member. After that, the recording material P is heated and pressurized by a fixing device 40, and hence the toner images on the recording material P are fixed to the recording material P.

Figure 2:
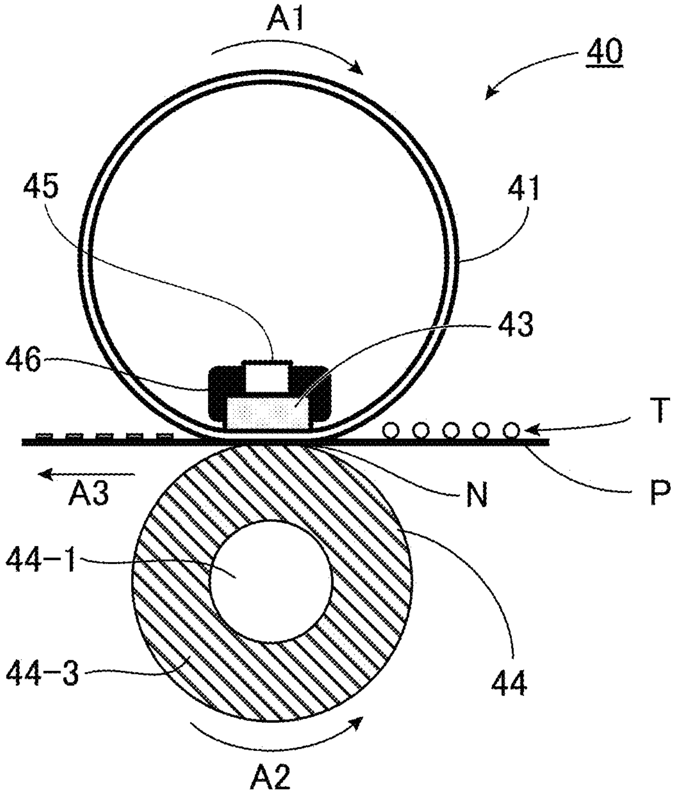
FIG. 2 is a schematic view of a fixing device in the first embodiment.

Next, a fixing device according to at least one aspect of the present disclosure is described. The fixing device 40 whose outline configuration is illustrated in FIG. 2 is a heating device of such a type (tensionless type) as to heat a fixing belt. However, the fixing device according to the present disclosure is not limited to the heating device of such type, and for example, a heating device of such a type as to heat a roller is also included therein. In Examples to be described later, the heating device of such a type as to heat a fixing belt illustrated in FIG. 2 was used.

In a ceramic heater (hereinafter described as "heater") serving as a heating body 43, at least a thin plate-shaped ceramic substrate extending in a direction (longitudinal direction) perpendicular to the drawing sheet and a resistor layer, which is arranged on the surface of the ceramic substrate and generates heat when energized, are integrated with each other. The ceramic heater 43 is held by a heater holder 46. The ceramic heater 43 is a low-heat capacity heater whose temperature is rapidly increased by the energization of the resistor layer. In addition, the ceramic heater 43 may be configured to be capable of switching the region of the resistor layer to be energized in accordance with the size of the recording material in its longitudinal direction.

Figure 3:
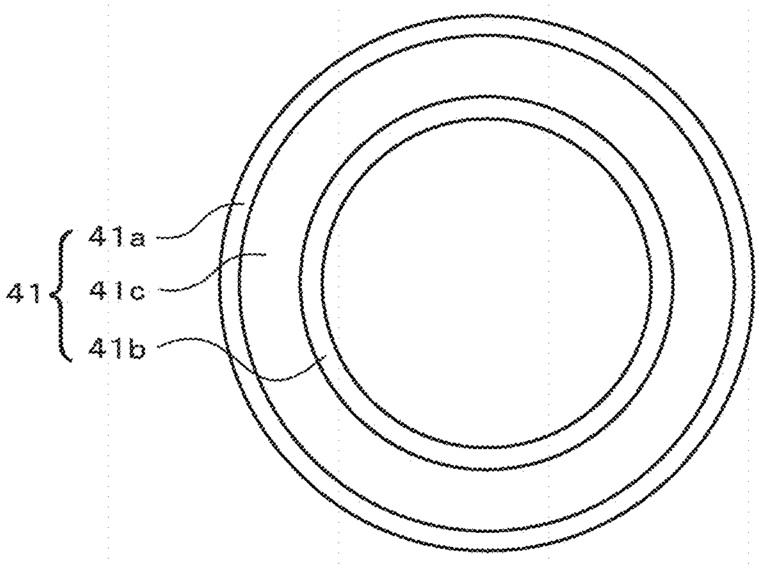
Prior Art FIG. 3
FIG. 3 is a schematic view of a fixing film in a related-art example.

A fixing belt 41 having an endless shape, the belt serving as a heating member for transferring heat to the unfixed toner images on the recording material P, is loosely fitted onto the supporting member (heater holder 46) including the above-mentioned heater 43. As illustrated in FIG. 3, the fixing belt 41 according to one aspect of the present disclosure includes at least a surface layer 41$a$, an elastic layer 41$c$, and a base layer 41$b$ in the stated order. The fixing belt according to the present disclosure may include a layer except the surface layer 41$a$, the elastic layer 41$c$, and the base layer 41$b$. For example, the belt may include an adhesion layer (not shown) between the surface layer 41$a$ and the elastic layer 41*c*, or may include a sliding layer (not shown) on the inner peripheral surface side of the base layer 41*b*.

A pressurizing roller 44 serving as a pressurizing member, which is arranged to face the fixing belt 41, includes a mandrel 44-1 and an elastic layer 44-3 on the outer peripheral surface of the mandrel 44-1. The elastic layer 44-3 contains, for example, a heat-resistant rubber, such as a silicone rubber or a fluorine rubber. The elastic layer may be a solid layer or a foam layer. Both the end portions of the mandrel 44-1 of the pressurizing roller 44 are rotatably supported with bearings. The fixing belt 41 and the ceramic heater 43 are pressed against the pressurizing roller 44 by a pressing member (not shown). In addition, when the ceramic heater 43 and the pressurizing roller 44 are brought into contact with each other through intermediation of the fixing belt 41, a fixing nip portion N having a predetermined width, the portion serving as a portion for heating unfixed toner images T on the recording material P, is formed.

The pressurizing roller 44 is rotationally driven by a driving unit (not shown) in a counterclockwise direction indicated by the arrow A2 at a predetermined rotational peripheral speed. A frictional force in the fixing nip portion N between the pressurizing roller 44 and the fixing belt 41 caused by the rotational driving of the pressurizing roller 44 applies a rotational force to the fixing belt 41. Then, the fixing belt 41 rotates following the rotational driving in a clockwise direction indicated by the arrow A1 while sliding in close contact with the downward surface of the heater 43. The supporting member (heater holder) 46 also serves as a member for guiding the rotation of the fixing belt 41 having a cylindrical shape.

The pressurizing roller 44 is rotationally driven, and the fixing belt 41 having a cylindrical shape rotates following the rotational driving. In addition, under a state in which the temperature of the ceramic heater 43 is adjusted to a predetermined fixation temperature, the recording material P bearing the unfixed toner images T is introduced into the fixing nip portion N. Then, in the fixing nip portion N, the surface of the recording material P bearing the unfixed toner images T is brought into close contact with the outer surface of the fixing belt 41, and the recording material is interposed and conveyed into the fixing nip portion N together with the fixing belt 41. In the interposition and conveyance process, the recording material P is heated by the heat of the fixing belt 41 heated by the heater 43, and hence the unfixed toner images T on the recording material P are heated and pressurized to be fixed to the recording material P. The recording material P that has passed through the fixing nip portion N is separated from the outer surface of the fixing belt 41, and is discharged from the nip portion N in a direction indicated by the arrow A3. The temperature of the fixing belt 41 heated by the ceramic heater 43 is measured by a contact-type temperature gauge serving as a contact-type thermistor 45, and the temperature of the fixing belt 41 can be controlled by a temperature-controlling unit (not shown) in accordance with the detected temperature.

Next, the fixing belt is described in detail. The fixing belt 41 according to at least one aspect of the present disclosure, which is illustrated in FIG. 3, has an endless shape. In addition, the belt includes the base layer 41*b*, the elastic layer 41*c* covering the outer surface thereof, and the surface layer 41*a* positioned on the surface side of the elastic layer 41*c* opposite to a side facing the base layer 41*b*. The belt may include an adhesion layer (not shown) for fixing the surface layer 41*a* onto the elastic layer 41*c* between the surface layer 41*a* and the elastic layer 41*c*.

(1) Base Layer

A material for the base layer 41*b* is not particularly limited, and a known material to be used as the base layer of a fixing belt such as a rotating body for fixation may be adopted. For example, metals and alloys, such as aluminum, iron, stainless steel, and nickel, and heat-resistant resins such as polyimide are each used. Although the thickness of the layer is not particularly limited, the thickness is preferably set to 20 μm or more and 100 μm or less from the viewpoints of, for example, the strength, flexibility, and heat capacity thereof. The outer surface of the base layer 41*b* may be subjected to surface treatment for imparting an adhesiveness with the elastic layer 41*c*. Physical treatment, such as blasting treatment, lapping treatment, and polishing, and chemical treatment, such as oxidation treatment, coupling agent treatment, and primer treatment, may be used alone or in combination thereof as the surface treatment.

When the elastic layer 41*c* containing a silicone rubber is arranged on the surface of the base layer 41*b*, the surface of the base layer 41*b* is preferably subjected to primer treatment for improving an adhesiveness between the base layer 41*b* and the elastic layer 41*c*. A primer to be used in the primer treatment is, for example, a paint obtained by appropriately blending and dispersing a silane coupling agent, a silicone polymer, hydrogenated methylsiloxane, an alkoxysilane, a reaction-accelerating catalyst, and a colorant such as red oxide in an organic solvent. The primer may be appropriately selected in accordance with the material for the base layer, the kind of the elastic layer, or the form of the crosslinking reaction of the rubber. In particular, when the elastic layer contains a large amount of an unsaturated aliphatic group, a primer containing a hydrosilyl group is suitably used for imparting the adhesiveness through its reaction with the unsaturated aliphatic group. When the elastic layer contains a large amount of a hydrosilyl group, a primer containing an unsaturated aliphatic group is suitably used. In addition to the foregoing, a primer containing an alkoxy group is also available as the primer. A commercial product may be used as the primer. In addition, the primer treatment includes a step of applying the primer to the outer surface (surface bonded to the elastic layer) of the base layer, followed by its drying or calcination.

(2) Elastic Layer

The elastic layer 41*c* is sandwiched between the surface layer 41*a* and the base layer 41*b*, and its entire thickness is 100 μm or more, and is preferably 200 μm or more. When the thickness of the entirety of the elastic layer is set to 100 μm or more, in the case where the fixing belt is incorporated into the fixing device, a sufficient nip width can be secured. The upper limit of the thickness of the elastic layer is 3 mm (3,000 μm) or less. When the thickness of the elastic layer is set to 3 mm or less, the flexibility of the fixing belt can be more reliably maintained. The entire thickness of the elastic layer is 100 μm or more and 3,000 μm or less. The entire thickness of the elastic layer may preferably be 200 μm to 350 μm, and more preferably be 350 μm to 3,000 μm.

The thermal conductivity of the entirety of the elastic layer in the thickness direction is 0.4 (W/(m·K)) or more. When the thermal conductivity in the thickness direction is 0.4 (W/(m·K)) or more, a heat transfer property in the thickness direction from the inner peripheral surface side of the fixing belt to the outer peripheral surface side thereof can be sufficiently secured. In addition, the upper limit of the thermal conductivity is not particularly limited. However, in order to increase the thermal conductivity, it is required to incorporate a large amount of the heat conductive fillers into the elastic layer, and this incorporation causes an increase in hardness of the elastic layer. Thus, the thermal conductivity is preferably 3.5 (W/(m·K)) or less, particularly preferably 2.0 (W/(m·K)) or less. The thermal conductivity of the elastic layer in the thickness direction is preferably from 0.4 (W/(m·K)) to 3.5 (W/(m·K)), particularly preferably from 0.8 (W/(m·K)) to 1.5 (W/(m·K)).

The elastic layer contains a rubber serving as a binder and fillers dispersed in the rubber. A material for the rubber is not particularly limited, and a known material to be used as the elastic layer of a fixing belt such as a rotating body for fixation may be adopted. However, a silicone rubber excellent in heat resistance is preferably incorporated. In addition, an addition-curable liquid silicone rubber is preferably used as a raw material for the silicone rubber.

To achieve the above-mentioned thermal conductivity of the elastic layer in the thickness direction (0.4 (W/(m·K)) or more), at least filler particles having high thermal conductivity are preferably incorporated as the fillers. Although a material for such filler having high thermal conductivity is not particularly limited, for example, inorganic matter, in particular, a metal and a metal compound are available. Specific examples of the filler having high thermal conductivity include particles formed of the following materials.

Silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), nickel (Ni), carbon black (C), a carbon fiber (C), and a carbon nanotube (C). Each of those particles may be used alone, or any two or more kinds thereof may be used as a mixture.

The particle diameter D50 of each of the fillers is preferably from 5 μm to 50 μm, particularly preferably from 5 μm to 30 μm. When the particle diameter D50 falls within the above-mentioned ranges, it becomes easier to set the thermal conductivity of the elastic layer in the thickness direction to 0.4 (W/(m·K)) or more.

The particle diameter D50 may be measured with, for example, a particle counter/analyzer. The particle counter/analyzer is, for example, a Coulter-type particle counter/analyzer (product name: CDA-1000, manufactured by Sysmex Corporation).

The content ratio of the fillers with respect to the entirety of the elastic layer is 35% by volume or more. The unit "% by volume" is hereinafter sometimes referred to as "vol %". When the content ratio of the fillers with respect to the entirety of the elastic layer is 35 vol % or more, the thermal conductivity of 0.4 (W/(m·K)) or more of the elastic layer in the thickness direction can be more easily achieved. In addition, the upper limit of the content ratio of the fillers with respect to the entirety of the elastic layer is not particularly limited, but the content ratio is preferably 60 vol % or less. When the content ratio is set to 60 vol % or less, an excess increase in hardness of the entirety of the elastic layer can be prevented. A method of measuring the content of the fillers in the elastic layer is described later. The content ratio of the fillers in the elastic layer is preferably from 35 vol % to 60 vol %, particularly preferably from 40 vol % to 60 vol %.

Figure 4:
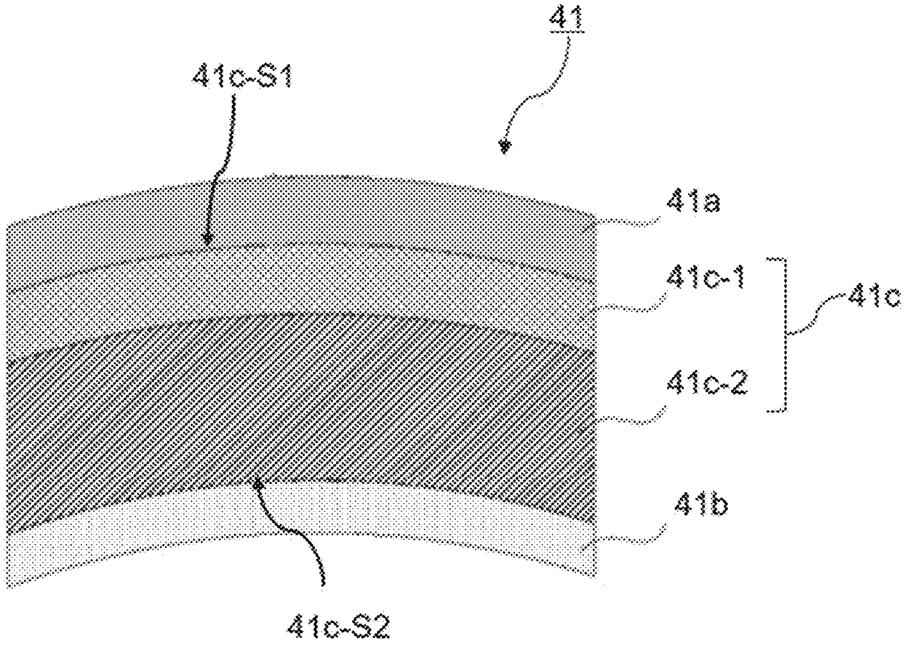
FIG. 4 is a schematic view of a fixing film in the first embodiment.

In addition, as illustrated in FIG. 4, in the region A from a surface 41_c_-S1 of the elastic layer 41_c_ according to the present disclosure on a side facing the surface layer 41_a_ to a depth of 50 μm toward a surface 41_c_-S2 thereof on an opposite side (41_c_-1 in FIG. 4), the content ratio of the fillers is less than 35 vol %, preferably 25 vol % or less with respect to the volume of the region A. The lower limit is not particularly limited, but the content ratio of the fillers in the region A is preferably 0 vol % from the viewpoint of preventing the rupture and the like of the elastic layer caused by strain applied to the elastic layer in the fixing step. That is, the region A is preferably free of the fillers. The content ratio of the fillers in the region A based on the volume of the region A is preferably 0 vol % or more and less than 35 vol %, particularly preferably 0 vol % or more and 25 vol % or less.

In addition, when a portion of the elastic layer 41_c_ except the region A, that is, an elastic layer 41_c_-2 in FIG. 4 is defined as "region B", it is appropriate that the content ratio of the fillers in the region B be adjusted so that the content ratio of the fillers in the entirety of the elastic layer 41_c_ becomes 35% or more in consideration of the content ratio of the fillers in the region A. For example, when the content ratio of the fillers in the region A is 0 vol %, that is, the region A is free of the fillers, the fillers are incorporated into the region B so that their content ratio is 35 vol % or more with respect to the volume of the entirety of the elastic layer 41_c_.

<Method of measuring Content Ratio of Fillers in Elastic Layer>

An example of a method of measuring the volume ratio of the fillers incorporated into the elastic layer is described. First, the base layer and the surface layer are peeled from the fixing belt, and only the elastic layer is left. The specific gravity of the elastic layer is measured with a specific gravity meter. The volume fraction of the fillers is calculated by using the result, and the specific gravity of the binder of the elastic layer and the specific gravities of the fillers thereof. For example, an automatic specific gravity meter (product name: DSG-1, manufactured by Toyo Seiki Seisaku-sho, Ltd.) may be used as the specific gravity meter. In addition, the volume fraction of the fillers in the region A and the volume ratio of the fillers in the region of the elastic layer except the region A (elastic layer 41_c_-2 in FIG. 4, hereinafter sometimes referred to as "region B") may be identified by using a thermogravimetric analyzer (TGA) (e.g., a product available under the product name "TGA851" from Mettler-Toledo International Inc.). That is, 20 mg of a sample, which has been cut out of each of the region A and the region B with a razor or the like, is precisely weighed, and is loaded into an alumina pan to be used in the thermogravimetric analyzer. The alumina pan containing the sample is set in the thermogravimetric analyzer, and is heated from room temperature to 800° C. at a rate of temperature increase of 20° C. per minute under a nitrogen atmosphere. Further, the temperature is kept constant at 800° C. for 1 hour. In the nitrogen atmosphere, a component except the filler particles is decomposed and removed by cracking along with the temperature increase, and hence the mass of the sample reduces. As a result, the mass of the filler particles in the sample can be calculated. Then, the specific gravity of the binder of the elastic layer and the specific gravities of the fillers, and the content (volume ratio) of the heat conductive filler particles in each region of the elastic layer are calculated.

<Hardness of Elastic Layer>

The type durometer hardness of the elastic layer measured based on Japanese Industrial Standard (JIS) K 6253-3:2012 is preferably from 9° to 25°. When the hardness falls within the above-mentioned range, the followability of the elastic layer to a recording material in the fixing step can be further improved. The hardness of the elastic layer only needs to be measured, for example, as follows: the elastic layer is cut out of the fixing belt, and the resultant pieces are superimposed on each other so that a thickness needed for the measurement is obtained, followed by the measurement of the hardness for the surface layer side of the elastic layer based on JIS K 6253-3:2012. A type E durometer for low hardness or a type A durometer for medium hardness is used as a tester to be used in the measurement of the durometer hardness. Specifically, for example, when a durometer hardness measured with the type E durometer is more than 20° (A20), the measurement is preferably performed again with the type A durometer.

<Method of Measuring Thermal Conductivity of Elastic Layer in Thickness Direction>

A nonlimitative method of measuring the thermal conductivity of the elastic layer in the thickness direction is described. The thermal conductivity λ, of the elastic layer in the thickness direction is calculated from the following equation:

$$\lambda=\alpha\times Cp\times\rho$$

where λ represents the thermal conductivity (W/(m·K)) of the elastic layer in the thickness direction, a represents the thermal diffusivity ($m^2$/s) thereof in the thickness direction, Cp represents the specific heat at constant pressure (J/(kg·K)) thereof, and p represents the density (kg/$m^3$) thereof. Here, the respective values of the thermal diffusivity α in the thickness direction, the specific heat at constant pressure Cp, and the density p are determined by the following methods.

Thermal Diffusivity α

The thermal diffusivity α of the elastic layer in the thickness direction is measured with a periodical heating method thermal diffusivity measurement system (product name: FTC-1, manufactured by Advance Riko, Inc.) at room temperature (25° C.). A rectangular sample piece measuring 8 mm by 12 mm is cut out of the elastic layer with a cutter, and a total of 5 sample pieces are produced. The thickness of each of the sample pieces is measured with a digital length measuring system (product name: DIGIMICRO (trademark) MF-501, flat probe: ϕ4 mm; manufactured by Nikon Corporation). Next, the thermal diffusivity α of each of the sample pieces is measured with the periodical heating method thermal diffusivity measurement system a total of five times, and the average ($m^2$/s) of the measured values is determined. The measurement is performed while the sample piece is pressurized with a weight of 1 kg.

Specific Heat at Constant Pressure Cp

The specific heat at constant pressure of the elastic layer is measured with a differential scanning calorimeter (product name: DSC823e, manufactured by Mettler-Toledo International Inc.). Specifically, aluminum-made pans are used as a pan for a sample and a reference pan. First, as blank measurement, under a state in which both the pans are empty, measurement is performed by the following program: a temperature in the calorimeter is kept constant at 15° C. for 10 minutes; and then, the temperature is increased to 215° C. at a rate of temperature increase of 10° C./min, and is further kept constant at 215° C. for 10 minutes. Next, measurement is performed by the same program through use of 10 mg of synthetic sapphire whose specific heat at constant pressure is known as a reference substance. Next, a measurement sample whose amount is the same as that of the synthetic sapphire serving as the reference substance, that is, 10 mg is cut out of the elastic layer, and is then set in the pan for a sample, followed by the performance of measurement by the same program. Those measurement results are analyzed with specific heat analysis software attached to the above-mentioned differential scanning calorimeter, and the specific heat at constant pressure Cp at a temperature of 25° C. is calculated from the average of the 5 measurement results.

Density ρ

The density of the elastic layer is measured with a dry automatic densimeter (product name: ACCUPYC 1330-01, manufactured by Shimadzu Corporation). Specifically, a sample cell having a volume of 10 $cm^3$ is used, and a sample piece is cut out of the elastic layer so as to account for about 80% of the volume of the cell. The mass of the sample piece is measured, and then the sample piece is loaded into the sample cell. The sample cell is set in a measuring portion in the densimeter, and helium is used as a gas for measurement. After the cell has been purged with the gas, the volume of the sample piece is measured 10 times. The density of the elastic layer is calculated from the mass of the sample piece and the measured volume for each measurement, and the average of the calculated values is determined. Thus, the thermal conductivity λ of the elastic layer in the thickness direction is calculated from the specific heat at constant pressure Cp (J/(kg·K)) and density ρ (kg/$m^3$) of the elastic layer each of which has been subjected to unit conversion, and the measured thermal diffusivity α ($m^2$/s).

(3) Surface Layer

The surface layer 41*a* contains a tetrafluoroethylene-perfluoroalkyl vinyl ether copolymer (PFA) and perfluoropolyether (PFPE). A fluorine resin material having a thickness of 100 μm or less, preferably from 10 μm to 70 μm may be used. Examples of the fluorine resin material include polytetrafluoroethylene (PTFE), fluorinated ethylene propylene (FEP), and PFA.

<Method of Producing Fixing Belt>

A nonlimitative method of producing the fixing belt according to at least one aspect of the present disclosure is described. The production method includes, for example, the following steps (P-1) to (P-8).

Step (P-1): A base layer is prepared.

Step (P-2): A paint for forming the region A of the elastic layer (hereinafter sometimes referred to as "first paint") is prepared. The first paint contains at least an uncrosslinked rubber. The first paint may or may not contain fillers. When the first paint contains the fillers, the content of the fillers is adjusted so that the ratio of the fillers accounting for the volume of a cured film (region A) having a thickness of 50 μm that is formed by curing the first paint becomes less than 35% by volume.

Step (P-3): A paint for forming the region B of the elastic layer (hereinafter sometimes referred to as "second paint") is prepared. The second paint contains at least an uncrosslinked rubber and fillers. The content of the fillers in the second paint is adjusted so that the amount of the fillers in the elastic layer to be formed finally becomes 35% by volume or more with respect to the elastic layer in a relationship with the content of the fillers in the first paint.

Step (P-4): The second paint is applied onto the base layer to form a coating film of the second paint (hereinafter sometimes referred to as "second coating film") having a predetermined thickness.

Step (P-5): The first paint is applied onto the second coating film to form a coating film of the first paint (hereinafter sometimes referred to as "first coating film"). In this case, the first coating film is formed so as to have a thickness of 50 μm after curing.

Before the step (P-5), the second coating film may be precured. For example, when the second coating film contains an addition-curable liquid silicone rubber, conditions for the precuring may be set as follows: the coating film is precured at a temperature of from 100° C. to 150° C. for from about 10 minutes to about 2 hours.

Step (P-6): The first coating film and the second coating film are cured to form the elastic layer. For example, when the first coating film and the second coating film each contain an addition-curable liquid silicone rubber, conditions for the curing may be set as follows: the coating films are cured at a temperature of from 180° C. to 200° C. for from 2 hours to 4 hours.

Step (P-7): A surface layer is formed on the outer surface of the elastic layer formed in the step (P-6). Examples of a method of forming the surface layer include: a method including covering the elastic layer with a tube containing a fluorine resin; and a method including applying fluorine resin particles onto the elastic layer, and then melting the fluorine resin particles to form a surface layer containing a fluorine resin.

A fixing belt including the elastic layer formed of the region A and the region B can be obtained through the above-mentioned steps (P-1) to (P-7).

According to one aspect of the present disclosure, there can be obtained a fixing member, which prevents the peeling of the surface layer through a reduction in shear force occurring at the interface between the surface layer and the elastic layer, and hence can achieve flexibility, high thermal conductivity, and a lengthened lifetime. In addition, according to another aspect of the present disclosure, a heat fixing device that contributes to the stable formation of a high-quality electrophotographic image can be obtained.

EXAMPLES

The fixing belt according to the present disclosure is described in more detail below by way of Examples and Comparative Examples. The fixing belt according to the present disclosure is not limited to configurations embodied in Examples. In addition, unless otherwise stated, commercially available first-grade or special-grade reagents were used as chemicals to be used. In addition, in Examples, the term "part(s)" means "part(s) by mass" unless otherwise stated.

Example 1

(Method of Producing Fixing Belt)

Next, a method of producing a fixing belt used in this Example is described. In this Example, such a fixing belt as illustrated in FIG. 4 was produced by a production method including the following steps P-1 to P-7.

(Step P-1)

A stainless steel (SUS 304)-made base material having an endless belt shape having an inner diameter of 25 mm, a width of 400 mm, and a thickness of 40 μm was prepared as a base layer. The outer peripheral surface of the base material (base layer) was subjected to primer treatment.

(Step P-2)

<Preparation of First Paint>

The agent A and agent B of an addition-curable liquid silicone rubber (product name: SE1886, manufactured by Dow Toray Co., Ltd.) were prepared, and were mixed with each other. A mixing ratio was as follows: when the total amount of the mixture was set to 100 parts by volume, the amount of the agent A was 50 parts by volume, and the amount of the agent B was 50 parts by volume. 51.25 Parts by volume of spherical alumina particles (product name: Alunabeads CB-A305; manufactured by Showa Denko K.K.) were added as fillers to 100 parts by volume of the resultant mixture. Then, the resultant was subjected to predispersion for 2 hours with a planetary mixer (product name: PVM-50, manufactured by Asada Iron Works. Co., Ltd.). After that, kneading with a triple roll mill (product name: SDX 600 CLC, manufactured by Buhler) was performed for 5 passes. Thus, a first paint was prepared.

(Step P-3)

<Preparation of Second Paint>

150 Parts by volume of spherical alumina particles (product name: Alunabeads CB-A30D; manufactured by Showa Denko K.K.) were added to 100 parts by volume of a mixed liquid obtained by mixing 50 parts by volume each of the liquid A and liquid B of the above-mentioned liquid silicone rubber. Then, the resultant was subjected to predispersion for 2 hours with a planetary mixer (product name: PVM-50, manufactured by Asada Iron Works. Co., Ltd.). After that, kneading with a triple roll mill (product name: SDX 600 CLC, manufactured by Buhler) was performed for 5 passes. Thus, a second paint was prepared.

(Step P-4)

The second paint was applied onto the outer peripheral surface of the base material prepared in the step P-1 by using a ring coating method so that its thickness after curing became 250 μm. Thus, a second coating film was formed. Next, the second coating film was precured at a temperature of 160° C. for 1 minutes.

(Step P-5)

Next, the first paint was applied onto the precured second coating film by using the ring coating method so that its thickness after curing became 50 μm. Thus, a first coating film was formed.

(Step P-6)

Next, the second coating film and the first coating film were heated at a temperature of 200° C. for 4 hours so that the uncured silicone rubber in each of the coating films was crosslinked. Thus, an elastic layer having an entire thickness of 300 μm was formed.

(Step P-7)

While the base material having formed thereon the elastic layer was rotated in its peripheral direction so that a peripheral speed became 20 mm/sec, the outer surface of the elastic layer was irradiated with UV light under an air atmosphere through use of a UV lamp placed at a position distant from the outer surface of the elastic layer by a distance of 10 mm. A low-pressure mercury UV lamp (product name: GLQ500US/11, manufactured by Toshiba Lighting & Technology Corporation) was used as the UV lamp, and the irradiation was performed so that the integrated light quantity of light having a wavelength of 185 nm on an irradiation surface became 800 $mJ/cm^2$. Next, an addition-curable silicone rubber adhesive (obtained by mixing equal amounts of the "liquid A" and "liquid B" of an adhesive available under the product name "SE 1819 CV" from Dow Corning Toray Co., Ltd.) was applied to the outer surface of the elastic layer in a substantially uniform manner so that its thickness became about 20 μm. Next, the resultant belt was covered with a fluorine resin tube (product name: 959HP-Plus, manufactured by Chemours-Mitsui Fluoroproducts Co., Ltd., thickness: 20 μm, melting point: 306° C.) whose inner surface had been subjected to hydrophilic treatment, and the surface of the belt was uniformly squeezed from above the fluorine resin tube. Thus, the adhesive in excess was squeezed out of a space between the elastic layer and the fluorine resin tube. Then, the base layer covered with the elastic layer and the fluorine resin tube serving as a surface layer was loaded into an electric furnace whose temperature had been set to 200° C., and was heated for 1 hour so that the adhesive was cured to bond the fluorine resin tube onto the elastic layer, followed by the cutting of both the ends of the resultant. Thus, a fixing belt having a width of 350 mm was obtained.

Next, various physical properties of the resultant fixing belt were evaluated.

<Thermal Conductivity of Elastic Layer in Thickness Direction>

The thermal conductivity λ of the elastic layer in its thickness direction was calculated from the following equation:

$$\lambda = \alpha \times Cp \times \rho$$

where λ represents the thermal conductivity of the elastic layer in the thickness direction (W/(m·K)), a represents a thermal diffusivity in the thickness direction ($m^2$/s), Cp represents a specific heat at constant pressure (J/(kg·K)), and ρ represents a density (kg/$m^3$). The respective values of the thermal diffusivity α in the thickness direction, the specific heat at constant pressure Cp, and the density ρ were determined by the following methods.

Thermal Diffusivity α

The thermal diffusivity α of the elastic layer in the thickness direction was measured with a periodical heating method thermal diffusivity measurement system (product name: FTC-1, manufactured by Advance Riko, Inc.) at room temperature (25° C.). A rectangular sample piece measuring 8 mm by 12 mm was cut out of the elastic layer with a cutter, and a total of 5 sample pieces were produced. The thickness of each of the sample pieces is measured with a digital length measuring system (product name: DIGIMICRO (trademark) MF-501, flat probe: ϕ4 mm; manufactured by Nikon Corporation). Next, the thermal diffusivity α of each of the sample pieces is measured with the periodical heating method thermal diffusivity measurement system a total of five times, and the average ($m^2$/s) of the measured values is determined. The measurement was performed while the sample piece was pressurized with a weight of 1 kg.

Specific Heat at Constant Pressure Cp

The specific heat at constant pressure of the elastic layer was measured with a differential scanning calorimeter (product name: DSC823e, manufactured by Mettler-Toledo International Inc.). Specifically, pans made of aluminum were used as a pan for a sample and a reference pan. First, as blank measurement, under a state in which both the pans were empty, measurement was performed by the following program: a temperature in the calorimeter was kept constant at 15° C. for 10 minutes, was then increased to 215° C. at a rate of temperature increase of 10° C./min, and was kept constant at 215° C. for 10 minutes. Next, measurement was performed through use of 10 mg of synthetic sapphire whose specific heat at constant pressure was known as a reference substance by the same program. Next, the same amount of a measurement sample as that of the synthetic sapphire serving as the reference substance, that is, 10 mg thereof was cut out of the elastic layer. After that, the sample was set in the pan for a sample, and measurement was performed by the same program. Those measurement results were analyzed with specific heat analysis software attached to the differential scanning calorimeter, and the specific heat at constant pressure Cp at a temperature of 25° C. was calculated from the average of the 5 measurement results.

Density ρ

The density of the elastic layer was measured with a dry automatic densimeter (product name: ACCUPYC 1330-01, manufactured by Shimadzu Corporation). Specifically, a sample cell having a volume of 10 $cm^3$ was used, and a sample piece was cut out of the elastic layer so as to account for about 80% of the volume of the cell. The mass of the sample piece was measured, and then the sample piece was loaded into the sample cell. The sample cell was set in a measuring portion in the apparatus. Helium was used as a gas for measurement, and the cell was purged with the gas. After that, the volume of the sample piece was measured 10 times. The density of the elastic layer was calculated from the mass of the sample piece and the measured volume for each measurement, and the average of the calculated values was determined.

As can be seen from the foregoing, the thermal conductivity λ, of the elastic layer in the thickness direction was calculated from the specific heat at constant pressure Cp (J/(kg·K)) and density ρ (kg/$m^3$) of the elastic layer each of which had been subjected to unit conversion, and the measured thermal diffusivity α ($m^2$/s).

<Measurement of Content (Volume Ratio) of Filler in Elastic Layer>

First, the base layer and the surface layer were peeled from the fixing belt, and only the elastic layer was left. The specific gravity of the elastic layer was measured with an automatic specific gravity meter (product name: DSG-1, manufactured by Toyo Seiki Seisaku-sho, Ltd.). The volume ratio of the fillers was calculated by using the result, and the specific gravity of the binder of the elastic layer and the specific gravities of the fillers thereof. In addition, the volume ratio of the fillers in the region A and the volume ratio of the fillers in the region B were measured with a thermogravimetric analyzer (TGA) (product name: TGA851, manufactured by Mettler-Toledo International Inc.). Specifically, 20 mg of a sample, which had been cut out of each of the region A and the region B with a razor, was precisely weighed, and was loaded into an alumina pan to be used in the thermogravimetric analyzer. The alumina pan containing the sample was set in the thermogravimetric analyzer, and was heated from room temperature to 800° C. at a rate of temperature increase of 20° C. per minute under a nitrogen atmosphere. Further, the temperature was maintained at 800° C. for 1 hour. In the nitrogen atmosphere, a component except the fillers is decomposed and removed by cracking along with the temperature increase, and hence the mass of the fillers in the sample can be calculated. Then, the volume ratio of the fillers in each region and the volume ratio of the fillers with respect to the entirety of the elastic layer were calculated from the specific gravity of the binder of the elastic layer and the specific gravities of the fillers, and the mass of the fillers in each sample.

<Measurement of Hardness of Elastic Layer>

The hardness (durometer hardness) of the elastic layer was measured as follows: the produced elastic layer was cut out, and the resultant pieces were superimposed on each other so that a thickness needed for the measurement was obtained, followed by the measurement based on Japanese Industrial Standard (JIS) K 6253:2012. More specifically, the measurement was performed in conformity with "Rubber, vulcanized or thermoplastic-Determination of hardness-Part 1: General guidance" specified in JIS K 6253-1:2012 and "Rubber, vulcanized or thermoplastic-Determination of hardness-Part 3: Durometer method" specified in JIS K 6253-3:2012. The hardness of each of Examples 1 to 9 and 11 to 13, and Comparative Examples 1 to 4 was measured with a type E durometer. Meanwhile, the hardness of each of Examples 10 and 14 was measured with the type E durometer, and as a result, the durometer hardness exceeded 20° (A20). Accordingly, the measurement was performed again with a type A durometer, and the measured value was regarded as the durometer hardness of the elastic layer according to each of Examples 10 and 14.

<Measurement of Particle Diameter (D50) of Filler>

5 Grams of a sample was shaved from each of the region A and region B of the elastic layer with a cutter. Each of the resultant samples was immersed in a silicone resin-dissolving agent (product name: eSOLVE 21RS, manufactured by Kaneko Chemical Co., Ltd.) so that the silicone rubber was dissolved. Thus, fillers in the sample were collected. The collected fillers were washed with toluene and dried at a temperature of 25° C. for 1 hour. The fillers thus taken out were subjected to measurement with a Coulter-type particle counter/analyzer (product name: CDA-1000, manufactured by Sysmex Corporation) to measure a value (median diameter, median) of D50. The value was adopted as a particle diameter.

(Evaluations of Various Fixation Characteristics of Fixing Device Using Fixing Belt of this Example)

Next, a fixing device mounted with the fixing belt according to this Example was evaluated for its various fixation characteristics. First, the fixing belt according to this Example was mounted on the fixing device illustrated in FIG. 2.

(Peeling Durability Evaluation)

In the fixing device illustrated in FIG. 2, the pressurizing force of the fixing belt against the pressurizing roller and the rotational speed of the pressurizing roller were set to 300 N in terms of total pressure and 200 mm/s, respectively, and the temperature of the outer surface of the fixing belt in a region to be brought into contact with a recording material was controlled to 130° C. "GF-0081" (product name, manufactured by Nippon Paper Industries Co., Ltd.) was used as the recording material. When the result of the evaluation was A or B in the following evaluation criteria, it was judged that the effect of the present disclosure was obtained. The evaluation results are shown in Table 2. In Table 2, the number in "peel lifetime" represents the number of sheet at which the peeling between the surface layer and the elastic layer was observed for the first time. Further, as to example (s) evaluated as rank A, the number in "peel lifetime" in Table 2 is indicated as "1000".

(Evaluation Criteria)

Rank A: No peeling between the surface layer and elastic layer of the fixing belt was observed even when printing was continuously performed on 1,000,000 sheets.

Rank B: Peeling between the surface layer and the elastic layer occurred when printing was continuously performed on 600,000 or more and less than 1,000,000 sheets.

Rank C: Peeling between the surface layer and the elastic layer occurred when printing was continuously performed on less than 600,000 sheets.

(Fixability Evaluation)

A reconstructed machine of a digital printer for commercial printing (product name: imageRUNNER ADVANCE C5560, manufactured by Canon Inc.) was used as an apparatus for forming an unfixed image. Specifically, the electrophotographic image forming apparatus was changed so that its fixation temperature, its process speed, a DC voltage VDC to be applied to a developer-carrying member thereof, a charging voltage VD to be applied to an electrostatic latent image-bearing member thereof, and its laser power were able to be arbitrarily set. In addition, a fixing device was removed from the apparatus. Then, a cyan unfixed solid image and a magenta unfixed solid image were formed on sheets of A4 size paper (product name: GF-0081, manufactured by Nippon Paper Industries Co., Ltd., basis weight: 80 $g/m^2$, thickness: 100 μm) with the above-mentioned apparatus for forming an unfixed image. The size of each of the solid images was set to a rectangular shape measuring 285 mm long by 205 mm wide. In addition, the laid-on levels of cyan toner and magenta toner on the paper were set to 0.50 $mg/cm^2$ in the formation of the unfixed solid images.

Next, the above-mentioned unfixed solid images were subjected to fixation with the fixing device having a structure illustrated in FIG. 2, the device being mounted with the fixing belt according to this Example, and the resultant fixed solid images were subjected to the following fixability evaluation test. In the fixing device, the pressurizing force of the fixing belt against the pressurizing roller was set to 300 N in total, the rotational speed of the pressurizing roller was set to 200 mm/s, and the temperature of the surface of the fixing belt to be brought into contact with the paper was set to 130° C.

The solid image portions of the fixed solid images thus obtained were bent and evaluated based on the following criteria. The evaluation results are shown in Table 2.

(Evaluation Criteria)

Rank A: Peel width of 0.5 mm or less.

Rank B: Peel width of more than 0.5 mm and 1.0 mm or less.

Rank C: Peel width of more than 1.0 mm.

Examples 2 to 7 and 9

The content ratio of the fillers in the region A and the content ratio of the fillers in the entirety of the elastic layer were changed as shown in Table 1. Each of fixing belts according to Examples 2 to 7 and 9 was produced in the same manner as in Example 1 except the forgoing.

Example 8

A second coating film and a first coating film were formed on the substrate in the same manner as in Example 4. Then, the corona charger was arranged so as to be parallel to the direction (axial direction) orthogonal to the circumferential direction of the substrate. At this time, the distance between the grid electrode of the corona charger and the surface of the first coating film was set to 5 mm. The surface of the first coating film was charged while the substrate was rotated at 100 rpm. As the charging conditions, the current supplied to the discharge wire of the corona charger was −150 μA, the grid electrode potential was 1 kV, and the discharge time was 20 seconds. By charging the surface of the first coating film before curing, the spherical alumina in the first and second coating films was arranged in the thickness direction of each coating film. Thereafter, the first coating film and the second coating film were cured under the same conditions as in Example 1 to form an elastic layer.

Example 10

A fixing belt was produced in the same manner as in Example 1 except that the heating temperature of the first and second coating films in Example 1 (Step P-6) was set to 250° C. The degree of crosslinking of the silicone rubber was increased by raising the heating temperature, and hence an elastic layer having high hardness was obtained.

Example 11

A fixing belt was produced in the same manner as in Example 1 except that the heating temperature of the first and second coating films in Example 1 (Step P-6) was set to 180° C. The degree of crosslinking of the silicone rubber was decreased by lowering the heating temperature, and hence an elastic layer having low hardness was obtained.

Example 12

Spherical alumina (product name: Alunabeads CB-P05, manufactured by Showa Denko K.K., D50=4 μm) was used as the fillers, and the content of the fillers in each of the paint 1 and the paint 2 was adjusted so that the content ratios of the fillers in the region A and the entirety of the elastic layer became values shown in Table 1. A fixing belt was produced in the same manner as in Example 1 except the foregoing.

Example 13

Spherical alumina (product name: Alunabeads CB-A505, manufactured by Showa Denko K.K., D50=50 μm) was used as the fillers, and the content of the fillers in each of the paint 1 and the paint 2 was adjusted so that the content ratios of the fillers in the region A and the entirety of the elastic layer became values shown in Table 1. A fixing belt was produced in the same manner as in Example 1 except the foregoing.

Example 14

A second coating film and a first coating film were formed on the substrate using the first paint and the second paint prepared in Example 12. The surface of the first coating film was then charged in the same manner as in Example 8. The first coating film and the second coating film were then heated at a temperature of 250° C. for 4 hours to cure to form an elastic layer. Thus, the fixing belt according to Example 14 was obtained.

Comparative Examples 1 to 4

First and second paints in each of which the amount of the fillers was adjusted so that the content ratios of the fillers in the region A and the entirety of the elastic layer became values shown in Table 1 were prepared. Fixing belts were each produced in the same manner as in Example 1 except that the first and second paints thus obtained were used.

TABLE 1

| | | Region A | Entirety of elastic layer | | | | | | |
|---|---|---|---|---|---|---|---|---|---|
| | | Filler amount % by volume | Filler amount % by volume | Thickness μm | Thermal conductivity W/(m · K) | JIS-A hardness ° | Filler particle diameter (D50) μm | Calcination temperature ° C. | Calcination Time hours |
| Example | 1 | 34.0 | 60.0 | 300 | 1.0 | 20.0 | 10 | 200 | 4 |
| | 2 | 0.0 | 60.0 | 300 | 0.6 | 20.0 | 10 | 200 | 4 |
| | 3 | 25.0 | 35.0 | 300 | 0.4 | 20.0 | 10 | 200 | 4 |
| | 4 | 25.0 | 60.0 | 300 | 0.7 | 20.0 | 10 | 200 | 4 |
| | 5 | 25.0 | 60.0 | 100 | 0.6 | 20.0 | 10 | 200 | 4 |
| | 6 | 25.0 | 60.0 | 3,000 | 1.5 | 20.0 | 10 | 200 | 4 |
| | 7 | 25.0 | 60.0 | 300 | 0.4 | 20.0 | 10 | 200 | 4 |
| | 8 | 25.0 | 60.0 | 300 | 3.5 | 20.0 | 10 | 200 | 4 |
| | 9 | 25.0 | 60.0 | 300 | 0.8 | 20.0 | 10 | 200 | 4 |
| | 10 | 25.0 | 60.0 | 300 | 1.8 | 25.0 | 10 | 250 | 4 |
| | 11 | 25.0 | 60.0 | 300 | 0.8 | 9.0 | 10 | 180 | 4 |
| | 12 | 25.0 | 60.0 | 300 | 0.8 | 20.0 | 5 | 200 | 4 |
| | 13 | 25.0 | 60.0 | 300 | 0.8 | 20.0 | 50 | 200 | 4 |
| | 14 | 34.0 | 60.0 | 300 | 3.5 | 25.0 | 5 | 250 | 4 |
| Comparative Example | 1 | 35.0 | 60.0 | 300 | 1.8 | 20.0 | 10 | 200 | 4 |
| | 2 | 25.0 | 34.0 | 300 | 0.38 | 20.0 | 10 | 200 | 4 |
| | 3 | 25.0 | 60.0 | 3,010 | 1.5 | 20.0 | 10 | 200 | 4 |
| | 4 | 25.0 | 60.0 | 300 | 0.38 | 20.0 | 10 | 200 | 4 |

TABLE 2

| | Durability | | Fixability | |
|---|---|---|---|---|
| | Peel lifetime (×1,000 sheets) | Rank | Peel width (mm) | Rank |
| Example 1 | 600 | B | 0.5 | A |
| Example 2 | 1000 | A | 1.0 | B |
| Example 3 | 1000 | A | 1.0 | B |
| Example 4 | 1000 | A | 1.0 | B |
| Example 5 | 600 | B | 0.5 | A |
| Example 6 | 1000 | A | 1.0 | B |
| Example 7 | 1000 | A | 1.0 | B |
| Example 8 | 1000 | A | 0.5 | A |
| Example 9 | 1000 | A | 0.5 | A |
| Example 10 | 1000 | A | 0.5 | A |
| Example 11 | 600 | B | 0.5 | A |
| Example 12 | 1000 | A | 0.5 | A |
| Example 13 | 600 | B | 0.5 | A |
| Example 14 | 600 | B | 0.5 | A |
| Comparative Example 1 | 300 | C | 1.0 | B |
| Comparative Example 2 | 300 | C | 1.0 | B |
| Comparative Example 3 | 600 | B | 2.0 | C |
| Comparative Example 4 | 600 | B | 2.0 | C |

In each of Examples 1 to 9, the heat transfer performance of the layer was able to be improved while the peeling between the surface layer and the elastic layer was prevented.

In addition, in each of Examples 10 and 11, an improvement in thermal conductivity of the elastic layer was able to improve the fixability of the fixing belt while improving the durability thereof.

In addition, in each of Examples 12 and 13, an increase in hardness of the elastic layer was able to achieve further lengthening of the lifetime of the fixing belt.

In addition, in Example 14, the thermal conductivity and durability of the fixing belt were able to be further improved.

As described above, there was able to be provided the fixing member, which prevented the peeling of its surface layer through a reduction in shear force occurring at an interface between the surface layer and the elastic layer by controlling the amount of the filler particles in the elastic layer near the surface layer, and hence was able to achieve flexibility, high thermal conductivity, and a lengthened lifetime.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-164721, filed Oct. 13, 2022, and Japanese Patent Application No. 2023-161480, filed Sep. 25, 2023, which are hereby incorporated by reference herein in their entirety.

What is claimed is:

1. A fixing belt having an endless shape comprising:
- a base layer having an endless shape;
- an elastic layer on an outer peripheral surface of the base layer; and
- a surface layer on an outer peripheral surface of the elastic layer,
- the elastic layer containing a rubber and fillers dispersed in the rubber,
- the fillers containing heat conductive fillers,
- an entire thickness of the elastic layer is from 100 μm to 3,000 μm,
- a content ratio of the fillers with respect to the entirety of the elastic layer being 35% by volume or more, wherein
- when a region from a surface of the elastic layer on a side facing the surface layer to a thickness of 50 μm toward a surface of the elastic layer on an opposite side is defined as a region A, a content ratio of the fillers in the region A is less than 35% by volume with respect to the region A, and
- wherein an entirety of the elastic layer has a thermal conductivity of 0.4 W/(m·K) or more in a thickness direction thereof.

2. The fixing belt according to claim 1, wherein the thermal conductivity is from 0.4 W/(m·K) to 3.5 W/(m·K).

3. The fixing belt according to claim 1, wherein the thermal conductivity is from 0.8 W/(m·K) to 1.5 W/(m·K), and the entirety of the elastic layer has a thickness of from 100 μm to 3,000 μm.

4. The fixing belt according to claim 1, wherein a content ratio of the fillers in the region A is 0% by volume or more and less than 35% by volume with respect to the region A.

5. The fixing belt according to claim 1, wherein a content ratio of the fillers in the region A is from 0% by volume to 25% by volume with respect to the region A.

6. The fixing belt according to claim 1, wherein a content ratio of the fillers with respect to the entirety of the elastic layer is from 35% by volume to 60% by volume.

7. The fixing belt according to claim 1, wherein the elastic layer has a durometer hardness of from 9° to 25° measured in accordance with Japanese Industrial Standard (JIS) K 6253-3:2012.

8. The fixing belt according to claim 1, wherein the heat conductive fillers each have a particle diameter D50 of from 5 μm to 50 μm.

9. The fixing belt according to claim 1, wherein the heat conductive fillers each have a particle diameter D50 of from 5 μm to 30 μm.

10. A heat fixing device comprising:
- a fixing belt having an endless shape; and
- a heating device to heat the fixing belt arranged inside the fixing belt,
- wherein the fixing belt includes:
- a base layer having an endless shape;
- an elastic layer on an outer peripheral surface of the base layer; and
- a surface layer on an outer peripheral surface of the elastic layer,
- the elastic layer contains a rubber and fillers dispersed in the rubber,
- the fillers contain heat conductive fillers,
- an entire thickness of the elastic layer is from 100 μm to 3,000 μm,
- a content ratio of the fillers with respect to an entirety of the elastic layer is 35% by volume or more, wherein
- when a region from a surface of the elastic layer on a side facing the surface layer to a thickness of 50 μm toward a surface of the elastic layer on an opposite side is defined as a region A, a content ratio of the fillers in the region A is less than 35% by volume with respect to the region A, and
- wherein the entirety of the elastic layer has a thermal conductivity of 0.4 W/(m·K) or more in a thickness direction thereof.

* * * * *